(12) United States Patent
Burbidge et al.

(10) Patent No.: US 7,821,975 B2
(45) Date of Patent: Oct. 26, 2010

(54) ESTABLISHING RADIO LINK CONTROL IN WIRELESS COMMUNICATION NETWORKS

(75) Inventors: Richard C. Burbidge, Hook (GB); Padmaja Putcha, Gurnee, IL (US); Ramesh Sudini, Lake Zurich, IL (US); Hui Zhao, Lindenhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 1133 days.

(21) Appl. No.: 11/149,875

(22) Filed: Jun. 10, 2005

(65) Prior Publication Data

US 2006/0281413 A1 Dec. 14, 2006

(51) Int. Cl.
- H04B 7/00 (2006.01)
- H04L 12/28 (2006.01)
- H04L 12/56 (2006.01)
- H04L 12/66 (2006.01)

(52) U.S. Cl. ............ 370/310; 370/395.2; 370/463
(58) Field of Classification Search ........... 370/395.2, 370/450, 454, 459, 463, 230
See application file for complete search history.

(56) References Cited

U.S. PATENT DOCUMENTS

| | | | | |
|---|---|---|---|---|
| 6,987,981 | B2 * | 1/2006 | Kuo | 455/502 |
| 7,171,224 | B2 * | 1/2007 | Sarkkinen et al. | 455/502 |
| 7,554,963 | B2 * | 6/2009 | Wu | 370/338 |
| 2001/0029188 | A1 | 10/2001 | Sarkkinen et al. | |
| 2003/0206534 | A1 | 11/2003 | Wu | |
| 2004/0153896 | A1 | 8/2004 | Jang | |
| 2004/0208160 | A1 * | 10/2004 | Petrovic et al. | 370/350 |
| 2008/0101608 | A1 * | 5/2008 | Jiang et al. | 380/270 |
| 2009/0168751 | A1 * | 7/2009 | Sharma et al. | 370/350 |

OTHER PUBLICATIONS

3GPP; Universal Mobile Telecommunications System (UMTS); Radio Link Control (RLC) Protocol Specification (3GPP TS 25.322 Version 6.3.0 Release 6); Mar. 2005; 84 pages.
Argentina Office Action dated May 7, 2010; Argentina Application No. 06 01 02436, Motorola; "Substantive Examination".
3GPP; "RLC Size Handling and RLC RE-Establishment" Ericsson, Qualcomm Europe; (3GPP TS 25.322 Version 5.7.0); May 2004; 10 pages.
CS26401RL Counterpart EPO Application No. 09008246.2; Extended European Search Report; Jun. 10, 2009; 9 pages. (Document XP-002313674).

* cited by examiner

*Primary Examiner*—Andrew Wendell

(57) ABSTRACT

A wireless communication terminal (300) including a radio transceiver (320), and a radio link control entity (310) that re-initiates a radio link control reset procedure when the transceiver receives a message containing an instruction to change an uplink or downlink protocol data unit size during an ongoing radio link control reset procedure. For example, the radio access network may initiate an uplink or downlink PDU size change before terminal receives acknowledgement that a previously initiated radio link control reset procedure is complete. The radio link control entity restarts a radio link control reset timer upon re-initiating the radio link control reset procedure after re-establishing radio link control.

20 Claims, 3 Drawing Sheets

ESTABLISHING RADIO LINK CONTROL IN WIRELESS COMMUNICATION NETWORKS

FIELD OF THE DISCLOSURE

The present disclosure relates generally to wireless communications, and more particularly to establishing and resetting radio link control in wireless communication networks, for example, in Universal Mobile Telecommunications System (UMTS) wireless communication networks, and methods.

BACKGROUND OF THE DISCLOSURE

The 3GPP Radio Link Control (RLC) protocol is a layer 2 retransmission protocol used to guarantee delivery of data over lossy radio channels. Higher layer service data units (SDUs) are segmented into fixed size RLC protocol data units (PDUs) prior to transmission over the air. The RLC protocol data unit (PDU) size is configured by the network when a radio bearer is first established. This allows the network to select an optimal RLC PDU size. In 3GPP Release 99, if the network wants to change the RLC PDU size after the radio bearer has been established, the RLC entity must be "re-established". RLC re-establishment however results in the loss of all data currently being transmitted in the uplink and downlink. For this reason, the typical RLC PDU size, for example 336 bits, used by networks is typically not changed during the life of the radio bearer.

The 3GPP Release 5 specification introduced High Speed Downlink Packet Access (HSDPA), which provides faster downlink (DL) data rates. At these higher data rates, larger RLC PDU sizes, for example, a 600 bit PDU size, are more efficient. However, if the user equipment (UE) moves to a cell where HSDPA is not supported, or moves to a low traffic state, then it is more efficient to use the another RLC PDU size, for example, 336 bits. Therefore, as the UE moves and the traffic volume changes, it is generally advantageous to change the downlink RLC PDU size.

According to Release 99 Radio Link Control (RLC) behavior, however, a change to the downlink RLC PDU size results in loss of data on both the downlink and uplink, even though the uplink RLC PDU size remains unchanged. In order to overcome this limitation, 3GPP Release 5 introduced a "single-sided RLC re-establishment" procedure that allows only the downlink side of the RLC entity to be re-established without adversely affecting data on the uplink. The "single-sided RLC re-establishment procedure" also allows only the uplink side of the RLC entity to be re-established without adversely affecting data on the downlink although this is a less likely scenario. The single-sided RLC re-establishment procedure is defined in the 3GPP specification at 25.331v5.9.0 and 25.322v5.8.0.

The single-sided RLC re-establishment introduced in Release 5, introduces problematic interactions with the RLC reset procedure. The RLC reset procedure involves signaling and synchronizing hyper frame numbers (HFNs), which are used for de/ciphering data blocks, between RLC peer entities. The RLC reset procedure is described in the 3GPP specification at 25.322. The problem occurs when a PDU size change occurs during an RLC reset procedure. The interaction between the RLC reset and the single-sided RLC re-establishment can result in peer RLC entities having a different HFN, resulting in corrupt data.

FIG. 1 is a prior art scenario where the interaction between the RLC reset and single-sided RLC re-establishment procedures is problematic. At block 110, a condition occurs within the user equipment (UE) that triggers an RLC reset procedure. For example, the RLC reset may be invoked when a PDU is retransmitted the maximum number of times. The RLC entity in the UE sends a RESET PDU containing the current value (equal to x) of the uplink hyper frame number (HFN). At 120, an RLC entity in the network receives the RESET PDU and performs a reset. This includes discarding both uplink and downlink data currently within the RLC entity, setting the current uplink (UL) HFN to the value (x+1), returning a RESET ACK PDU containing the current downlink HFN (equal to y), and then setting the current downlink (DL) HFN to be (y+1). The RLC entity in the UE waits for the RESET ACK until a timer RST expires. At 130, the network initiates a downlink RLC PDU size change before the UE RLC entity receives the RESET ACK. The network sends a Reconfiguration message informing the UE of the downlink RLC PDU size change. At 140, the UE receives the Reconfiguration message before receiving the RESET ACK. At 140, the UE performs the downlink only re-establishment, setting the downlink HFN value to equal START, and sending a Reconfiguration Complete message containing the START value. The START value is calculated as the highest HFN used by all radio bearers in the UE so its value may not be derived from the HFN of the RLC entity being re-established. At 150, having received the Reconfiguration Complete message containing the START value, the network performs a single sided RLC re-establishment setting the DL HFN to the START value. At the UE, if the Timer RST expires before the UE RLC entity receives the RESET ACK PDU, the UE retransmits the RESET PDU. According to the current 3GPP specification, the UE is required to transmit an identical PDU containing the UL HFN value x sent originally. The network receives the RESET PDU but takes no action (since is has already received this RESET PDU) except to resend the RESET ACK PDU containing the DL HFN value (equal to y) sent previously. At 160, the UE receives the RESET ACK PDU and performs the RLC reset actions, setting the downlink HFN to the value (y+1). As a result of the above sequence there is an HFN mismatch between the UE and the UTRAN. The UE has the DL HFN set to y+1 and the network has the DL HFN set to the START value. The downlink HFN of the UE and UTRAN are thus incorrectly aligned, which will result in data corruption.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
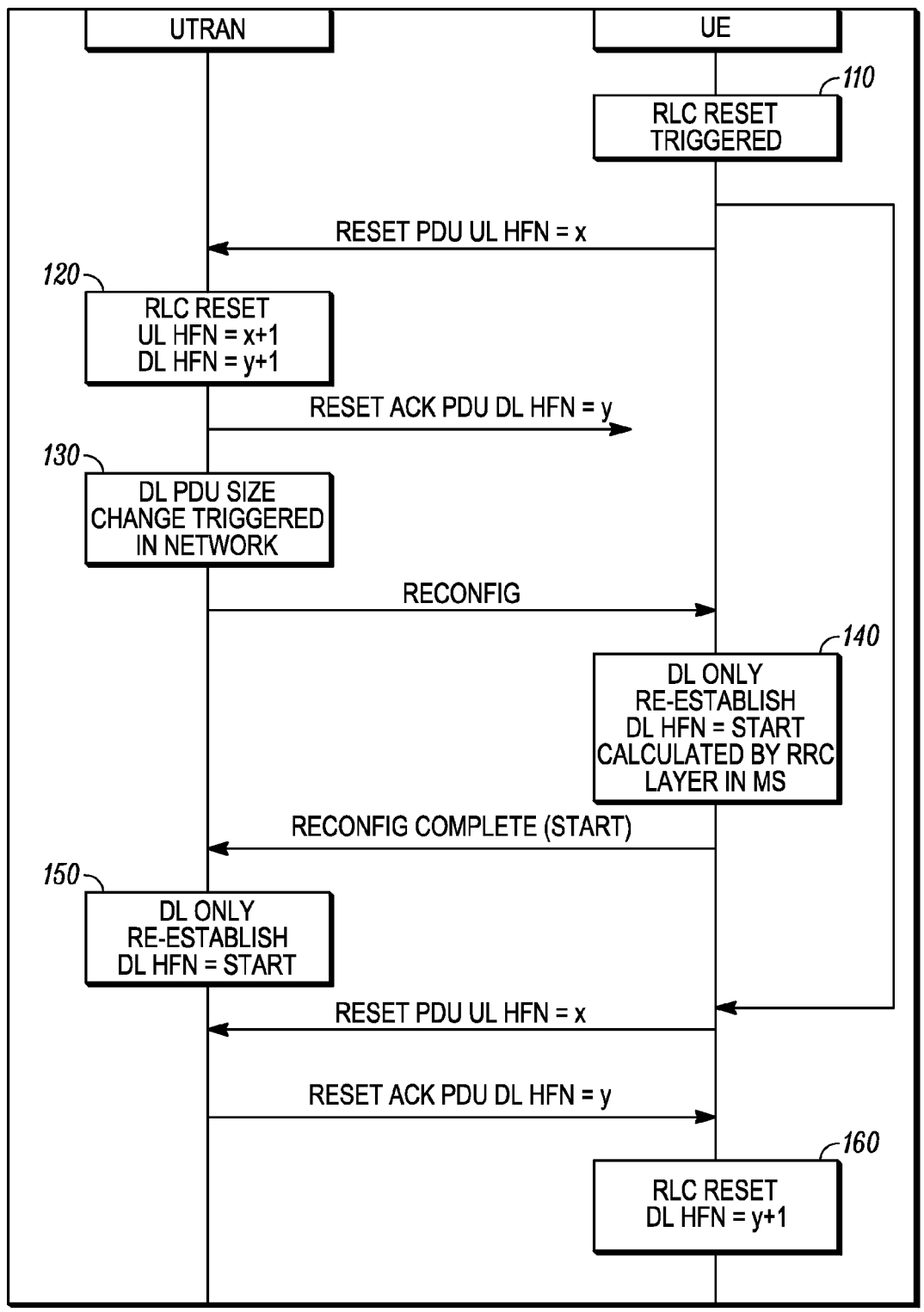
FIG. 1 is a prior art process for establishing and resetting radio link control in a wireless communication network.
Figure 2:
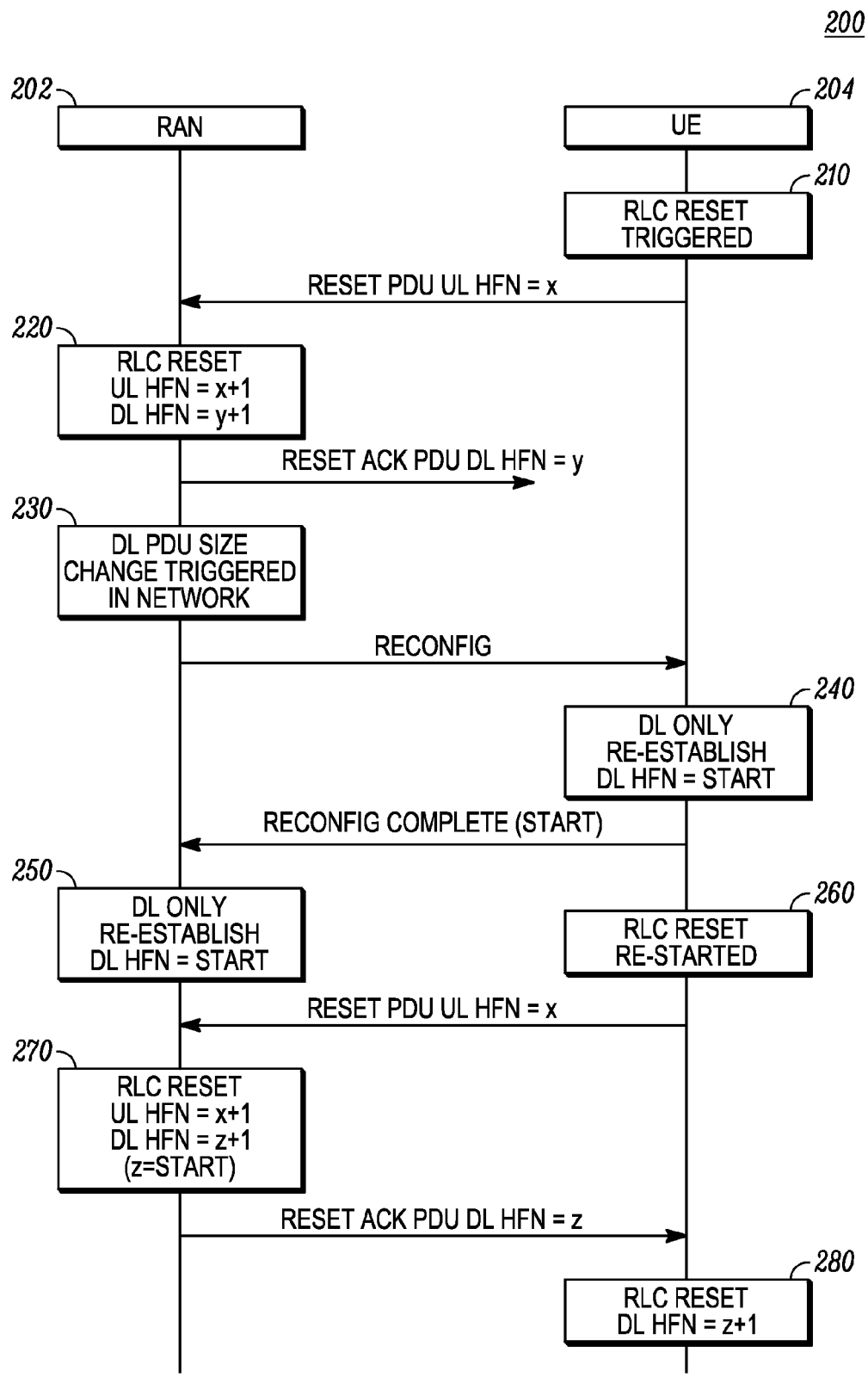
FIG. 2 is a process for establishing and resetting radio link control in a wireless communication network.

FIG. 2 illustrates a process 200 for establishing and resetting radio link control in a wireless communication device communicating with a Radio Access Network. The RAN generally includes a base station controller (BSC) and multiple base transceivers stations (BTS) of a wireless communication network. An exemplary RAN is the Universal Terrestrial Radio Access Network (UTRAN) for Universal Mobile Telecommunications System (UMTS) W-CDMA among other existing and future radio access networks. The UE is a fixed-based or mobile communication terminal, for example, a cellular communication handset, personal digital assistant (PDA) or a cellular communication card for use with a portable computing device. The disclosure is not limited however to any particular radio access network or mobile communication terminal. In FIG. 2, the RAN is a UTRAN 202 and the wireless communication device is user equipment (UE) 204.

At block 210, a condition occurs within the user equipment (UE) 204 that triggers a radio link control (RLC) reset procedure. The RLC reset procedure may be invoked, for example, when a protocol data unit (PDU) is retransmitted some maximum number of times, or for some other reason. For this disclosure, the particular event initiating the RLC reset procedure in the UE is inconsequential. During the RLC reset procedure, the UE 204 sends a RESET PDU on the uplink (UL) to the radio access network 202. The RESET PDU originated by the UE contains current value of an uplink hyper frame number (HFN). In FIG. 2, the current value of the HFN is HFN=x. The RESET PDU also contains a reset sequence number (RSN) that is set to the value used in the previous reset procedure incremented by 1. In the case of the first reset procedure to have occurred since the RLC entity was established or re-established, the RSN value is set to zero. The reset sequence number allows the RESET and RESET ACK messages of one RLC reset procedure to be distinguished from those of another RLC reset procedure.

Figure 3:
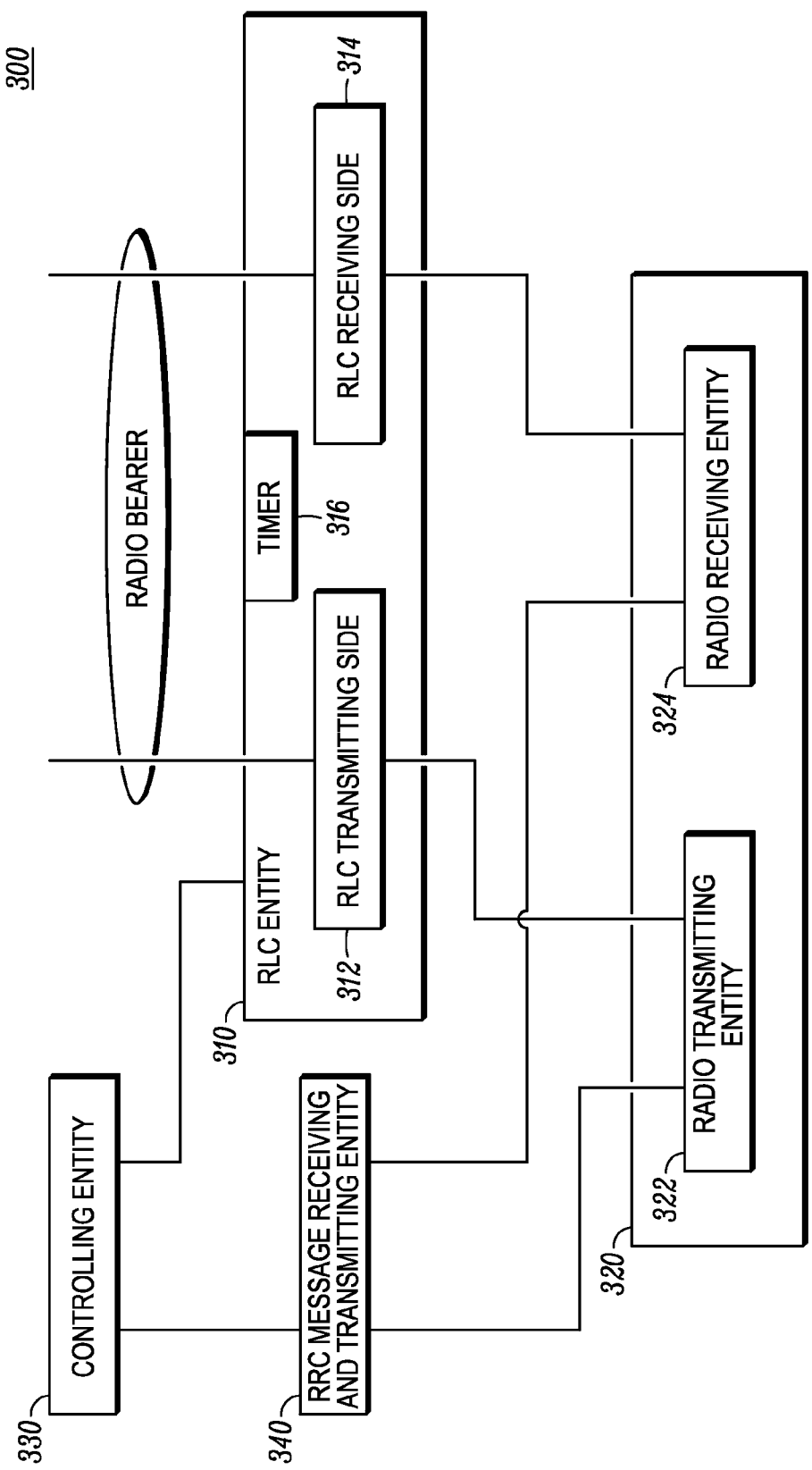
FIG. 3 is schematic block diagram of an exemplary mobile communication terminal.

FIG. 3 is a partial schematic block diagram of exemplary user equipment (UE) 300 comprising a radio link control (RLC) entity 310 communicably coupled to a transceiver 320 and controller 330. An RLC transmitting side 312 of the RLC entity is communicably coupled to a radio transmitting entity 322, and an RLC receiving side 314 of the RLC entity is communicably coupled to a receiving entity 324. During an RLC reset procedure, for example, the reset procedure initiated at block 210 in FIG. 2, the RLC transmitting side 312 of the RLC entity sends the RESET PDU to the radio access network via a radio transmitting entity 322 under control of the controller 330. Also, the UE starts an RLC reset timer 316 when the RLC reset procedure is initiated. If the timer expires before the UE receives a reset acknowledgement from the RAN, the UE resends the RESET PDU and re-starts the timer. The existence or running of the RLC reset timer thus implies an ongoing RLC reset procedure.

In FIG. 2, at 220, an RLC entity in the RAN 202 receives the RESET PDU and the current HFN values and performs a reset. This includes discarding both uplink and downlink data currently within the RLC entity, setting the current uplink (UL) HFN to the value (x+1), returning a RESET acknowledge (ACK) protocol data unit (PDU) containing the current downlink HFN (equal to y) to the UE 204, and then setting the current downlink (DL) HFN to (y+1).

In FIG. 2, the UE 204 awaits the RESET ACK from the RAN 202 while the RLC reset timer is running, as discussed above. At 230, the RAN 202 initiates a downlink (DL) radio link control (RLC) protocol data unit (PDU) size change before the UE RLC entity receives an acknowledgement of the RLC reset from the RAN. The RAN sends a reconfiguration message informing the UE of the downlink RLC PDU size change. At 240, the UE 204 receives the reconfiguration message having the DL PDU size change request before receiving the RESET ACK. The RLC reset acknowledgement may be delayed by network traffic, loss over the radio channel, or for some other reason. While in the exemplary embodiment the RAN initiates a downlink PDU size change in a single sided RLC re-establishment procedure, more generally, the RAN may initiated a PDU size change on the uplink without adversely affecting data on the downlink. Thus in FIG. 2, at 230, the RAN 202 may alternatively initiate an uplink PDU size change.

In FIG. 2, at 340, the UE 204 performs the downlink only re-establishment, setting the downlink HFN value to equal START, and sending a reconfiguration complete message containing the HFN START value to the RAN 202. The HFN START value is calculated by the UE as the highest HFN used by all RLC entities in the UE, so the HFN value may not be derived from the HFN of the RLC entity being re-established. At 250, after having received the reconfiguration complete message containing the START value from the UE 204, the RAN 202 performs a single sided RLC re-establishment setting the DL HFN to the START value.

In FIG. 2, generally, the message sent from the RAN 202 to UE 204 to change the downlink RLC PDU size and the response message from the UE to the network are radio resource control (RRC) messages. FIG. 3 illustrates an RRC entity 340 communicably coupled to the transmitter and receiver entities of the transceiver 320 and to the controller 330.

In FIG. 2, at 260, if the single-sided RLC re-establishment occurs during a pending RLC reset procedure, i.e., while the RLC reset timer is still running, the RLC reset procedure is restarted after the single sided re-establishment has occurred. Re-initiating the RLC reset procedure basically involves sending a new RESET PDU containing the HFN set to the current value (instead of the same value as used in the previous reset procedure that was not completed) containing an incremented reset sequence number, and restarting the reset timer. In one embodiment, the full RLC reset procedure occurs immediately after the single sided re-establishment procedure is completed to ensure that the HFN of the UE and RAN are synchronized. Thus in FIG. 2, the UE 204 sends a RESET PDU on the uplink (UL) to the radio access network 202. The RESET PDU contains the current value of an uplink hyper frame number (HFN=x). In addition, the reset sequence number sent in the RESET PDU must be incremented compared to that used in the previous RLC reset procedure. The reset sequence number is not set back to zero as would normally be the case following a re-establishment. Thus in FIG. 2, at 260, the UE sets a reset sequence number (RSN) of the radio link control reset protocol data unit (RESET PDU) to a value of a last used reset sequence number incremented by one.

According to the prior art procedure, the RLC entity receiving a RESET PDU (RAN 202 in FIG. 2) is required to perform the reset function if that RESET PDU is the first one received since RLC establishment or re-establishment, or if the reset sequence number received in the RESET PDU is different from the RSN received in the last received RESET PDU. Therefore, in FIG. 2, at step 270, the RAN 202 will act on the received RESET PDU as it is the first one received following a re-establishment procedure.

In FIG. 2, due to delays over the radio interface or within the network, there is a possibility that the RAN 202 will receive the RESET PDU sent at 210 after the RLC re-establishment and that it will act on this RESET PDU. If the RESET PDU that is sent at 260 has the same reset sequence number (RSN) as the RESET PDU sent at step 210 then the RAN 202 will not act on this PDU at step 270. According to the present disclosure, if the UE increments the reset sequence number (rather than using a value zero) after a single sided re-establishment, then it ensures that the RLC entity receiving the RESET PDU (RAN 202 in FIG. 2) always acts on this RESET PDU.

In FIG. 2, at 270 the RAN 202 acts on the received RESET PDU containing HFN=x by setting the UL HFN to the value (x+1). Due to the single sided re-establishment, the current value (z) of the downlink HFN is equal to START. The RAN 202 sets the downlink HFN to value (z+1) and sends a RESET ACK PDU containing HFN=z. At 280 the UE 204 receives the RESET ACK PDU and acts on it by setting the DL HFN to value (z+1). Now the RAN 202 and the UE 204 have the same value (x+1) for the UL HFN and the same value (z+1) for the DL HFN and so ciphered data transfer can occur in both uplink and downlink directions without corruption of data.

In FIG. 3, the radio link control entity 310 re-initiates a radio link control reset procedure when the receiver entity 324 receives, from the RNC, a message containing an instruction to change a downlink protocol data unit size during an ongoing radio link control reset procedure. According to this procedure, the radio link control entity aborts the ongoing radio link control reset upon re-initiating the radio link control reset procedure. In one embodiment, the radio link control entity re-initiates the radio link control reset procedure only if the radio link control reset procedure is not acknowledged before re-establishing radio link control. The radio link control reset timer 316 is restarted upon re-initiating the radio link control reset procedure after re-establishing radio link control. As discussed above, the radio link control reset procedure is re-initiated by incrementing a last used reset sequence number of a radio link control reset protocol data unit by one.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a mobile wireless communication device, comprising:
   re-establishing radio link control during an ongoing radio link control reset procedure;
   re-initiating the radio link control reset procedure after re-establishing radio link control.

2. The method of claim 1, re-initiating the radio link control reset procedure only if the radio link control reset procedure is not acknowledged before re-establishing the radio link control.

3. The method of claim 1,
   running a radio link control reset timer during the ongoing radio link control reset procedure;
   after re-establishing radio link control, re-initiating the radio link control reset procedure including restarting the radio link control reset timer is running.

4. The method of claim 1, re-initiating the radio link control reset procedure includes aborting the ongoing radio link control reset and restarting a new radio link reset procedure.

5. The method of claim 1, re-establishing single-sided radio link control during an ongoing radio link control reset procedure.

6. The method of claim 1, initiating the ongoing radio link control reset procedure at the mobile wireless communication device.

7. The method of claim 6, re-establishing radio link control includes re-establishing only downlink radio link control.

8. The method of claim 6, re-establishing radio link control includes re-establishing only uplink radio link control.

9. The method of claim 1, re-establishing radio link control includes:
   receiving a message during the ongoing radio link control reset procedure, the message containing an instruction to change a downlink protocol data unit size,
   setting a hyperframe number and a discarding protocol data unit.

10. The method of claim 1, re-initiating the radio link control reset procedure includes setting a reset sequence number of a radio link control reset protocol data unit to a value of a last used reset sequence number incremented by one.

11. A method in a wireless communication terminal, the method comprising:
    initiating a first radio link control reset procedure;
    receiving message after initiating the radio link control reset procedure and before the radio link reset procedure is complete, the message containing an instruction to set a protocol data unit size;
    initiating a second radio link control reset procedure after setting the protocol data unit size.

12. The method of claim 11, initiating the second radio link control reset procedure only if the first radio link control reset procedure has not been completed before receiving the message containing the instruction to set the protocol data unit size.

13. The method of claim 11, initiating the second radio link control reset procedure includes setting a reset sequence number of a radio link control reset protocol data unit to a value of a last used reset sequence number incremented by one.

14. The method of claim 13, initiating the second radio link control reset procedure includes aborting the first radio link control reset procedure before initiating the second radio link control reset procedure.

15. A wireless communication terminal capable of communicating with a radio access network, comprising:
    a radio transceiver including a receiver and a transmitter,
    a radio link control entity communicably coupled to transceiver,
    the radio link control entity re-initiating a radio link control reset procedure when the receiver receives a message containing an instruction to change a protocol data unit size during an ongoing radio link control reset procedure.

16. The terminal of claim 15, radio link control entity re-initiating the radio link control reset procedure only if the radio link control reset procedure is not acknowledged before re-establishing radio link control.

17. The terminal of claim 15, the radio link control entity including a radio link control reset timer, the radio link control entity restarting the radio link control reset timer upon re-initiating the radio link control reset procedure after re-establishing radio link control.

18. The terminal of claim 15, the radio link control entity aborting the ongoing radio link control reset upon re-initiating the radio link control reset procedure.

19. The terminal of claim 15, the radio link control entity re-initiating the radio link control reset procedure by incrementing a last used reset sequence number of a radio link control reset protocol data unit by one.

20. The terminal of claim 15, the message received containing a single-sided radio link control re-establishment instruction to change one of a downlink or uplink protocol data unit size.

\* \* \* \* \*